(12) United States Patent
Lewin et al.

(10) Patent No.: US 7,876,421 B2
(45) Date of Patent: Jan. 25, 2011

(54) LIGHT METER APPARATUS AND SYSTEM

(75) Inventors: Ian Lewin, 11408 St. Andrews Way, Scottsdale, AZ (US) 85254; John K. O'Farrell, Cave Creek, AZ (US); James L. Domigan, Phoenix, AZ (US)

(73) Assignee: Ian Lewin, Scottsdale, AZ (US)

( * ) Notice: Subject to any disclaimer, the term of this patent is extended or adjusted under 35 U.S.C. 154(b) by 0 days.

(21) Appl. No.: 12/011,661

(22) Filed: Jan. 29, 2008

(65) Prior Publication Data

US 2009/0190119 A1   Jul. 30, 2009

(51) Int. Cl.
  *G01C 3/08* (2006.01)
(52) U.S. Cl. .................... 356/4.07; 356/3.01; 356/3.15; 356/4.01; 356/4.1
(58) Field of Classification Search ........... 356/3.01–22
  See application file for complete search history.

(56) References Cited

U.S. PATENT DOCUMENTS

| | | | |
|---|---|---|---|
| 2,929,295 A | 3/1960 | Vos | |
| 3,087,379 A | 4/1963 | Rogers | |
| 3,582,666 A | 6/1971 | Geiger | |
| 3,634,694 A | 1/1972 | Hardesty | |
| 3,843,267 A | 10/1974 | Vital | |
| 3,843,835 A * | 10/1974 | Mosca et al. | 348/335 |
| 4,737,029 A | 4/1988 | Yabusaki | |
| 5,185,637 A | 2/1993 | Lewin | |
| 5,323,226 A | 6/1994 | Schreder | |
| 5,442,716 A | 8/1995 | Otsu | |
| 6,088,085 A * | 7/2000 | Wetteborn | 356/5.01 |
| 2003/0103769 A1* | 6/2003 | Ohkado | 396/111 |
| 2004/0105091 A1* | 6/2004 | Zaidi et al. | 356/221 |
| 2005/0110976 A1* | 5/2005 | LaBelle | 356/5.01 |
| 2006/0066957 A1* | 3/2006 | Fukui | 359/689 |

FOREIGN PATENT DOCUMENTS

GB   2372314   10/2000

OTHER PUBLICATIONS

Photo Research, Inc. 2004, PR-880 Automated Filter, Photometer/Colorimeter.
TruPuLse 200 and 360 Laser Rangefinders. Laser Technology, Inc. Centennial, Co. 80112.
London Electronics Limited, BCS input remote/slave displays.
Optics for You, poti-logic RS400 Industrial Laser Range Finder w/ RE 22 Serial computer Interface Port.

* cited by examiner

*Primary Examiner*—Thomas H Tarcza
*Assistant Examiner*—Luke D Ratcliffe
(74) *Attorney, Agent, or Firm*—Douglas W. Rudy

(57) ABSTRACT

A light meter for measuring photometric quantities includes a telephotometer having a photo detector to receive light energy entering the telephotometer. A light metering valve, for the purpose of providing a variable field of view, is located in the body of the telephotometer generally at the focal plane of the objective lens of the telephotometer. A controller, which includes a digital processor in communication with the photo detector will process information from the photo detector and from a range finder included in the system to output light intensity of a target light source.

15 Claims, 10 Drawing Sheets

LIGHT METER APPARATUS AND SYSTEM

BACKGROUND OF THE INVENTION

1. Field of the Invention

This invention is related to a device, and a method of using the device, that is used to measure various photometric quantities of the light emanating from a light source. Generally a light source, particularly an exterior light source, is configured and positioned to cast light in a desirable pattern. Often the light source will indiscriminately emit light such that the some of the emitted light is directed beyond the intended lighted zone. Light extending beyond the targeted object of the lighting system is "spillover." When spillover extends beyond property lines it is known as "trespass light" and may be objectionable to people subjected to this intrusive trespass light.

The device presented in this disclosure measures the light from a distant light source. The distant light source may be the source of spillover light, trespass light and a source of glare. The measurement of spillover and trespass light is the target of the measurement equipment presented herein. The measurement of the trespass light will be used to determine the acceptability of the light source configuration, that is, whether or not the trespass light or glare is acceptable or unacceptable in a particular situation.

A telescopic light-sensing meter used to measure illumination levels of distance sources of light, sometimes referred to as a telephotometer, is disclosed herein. The light sensing device, including the telephotometer is connected to a processing unit that will process information from the telephotometer. The processor will also receive information from a range finder. Data from the range finder and the enhanced telephotometer is processed and a finite number is displayed to the equipment user.

2. Description of the State of the Art

Outdoor lighting meters are available to measure illuminance values in lux or footcandles. These state of the art light meters measure only the illuminance of the area on which the light falls. These are simple portable meters with a light sensitive cell that rests on the surface of interest and generates a signal to an appropriate display, which then indicates the illuminance level of the surface being measured. The meter is effective in measuring illuminance on vertical surfaces, such as a vertical window of a residence. The meter may also be used to measure illuminance on a horizontal surface, such as on a floor of a building. This method does not meet today's need of measuring spillover or trespass lighting in terms of light intensity.

Other meters, referred to above and hereinafter referred to as telephotometers are available. Telephotometers use a lens to focus the image of a light source of interest onto a light sensitive cell. Frequently the focusing optics are similar to those used in a telescope and can be used to capture light from a distant source. The quantity measured by a telephotometer is the luminance of the area at which the telephotometer is aimed, luminance being the intensity of light per unit area of the area being measured. Luminance measurements are usually stated as footlamberts or candelas per square meter.

It has been recently realized that there is a need to measure light intensity "in the field" rather then simply in a laboratory setting. There is no known apparatus or method of doing this and thus the inventors herein embarked on the development of a light meter that can measure light intensity in the field and fulfill a heretofore unfilled need in today's lighting intensive society.

In many situations a homeowner or a municipal body may have a complaint of spillover lighting. Unfortunately, up to now, there is no way to measure the spillover or trespass light without placing a meter directly on an affected surface to measure illuminance on the surface. However placement of a light meter close to and proximate a surface is sometimes impractical or impossible. It would be very desirable if there were equipment available to measure the intensity of a particular light source and not just illuminance on a surface lit by the light source. The apparatus presented here fulfills the heretofore unattained goal of field measurement of light intensity by providing a light meter that can measure the intensity of light from a distant light source.

It has also been found that it is more useful to measure intensity of light at a point distant from the light source, rather than to measure the illuminance of light falling on a surface.

SUMMARY OF THE INVENTION

There is an increasing awareness in communities and public service companies of the need to conveniently measure the intensity of light sources. It is desirable and important to be able to make light intensity measurements in the field. Today light intensity is only measured in laboratory settings and translation of such measurement to real life situations in the field environment is not as accurate or usable as is desired. With consistent field measurement of the intensity of light at a particular location distant from the light source, the regulation of unwanted light from outdoor lighting fixtures can be fairly and uniformly addressed. If light energy or light rays emitted by light fixtures illuminate areas outside of that area which they are intended to light, the light is considered to be "spillover light," or "trespass light." Spillover light, in residential neighborhoods, disturbs the tranquility of the night sky resulting in diminished quality of life and in some cases, may be detrimental to the health and well being of humans.

Spillover light is also unnecessarily wasteful and may be esthetically unpleasing and environmentally undesirable. Moreover, such light will often be perceived by persons in nearby areas as disability glare, discomfort glare, or nuisance or annoyance glare, which are all generally objectionable and may be dangerous or cause discomfort.

Environmental lighting zones have been proposed where the amount of spillover light and glare will be limited by law, with the limits related to some form of zoning. The limits may be of various and different types. For example, the intensity of light output from a light source, measured in candelas, may have a specified limit; any light source fixture having intensity values measured in zones beyond the intended area to be lit that are higher than the limitation set forth in a regulation may not be permitted by a local or national code. The apparatus set forth herein allows for the field measurement of the intensity of light and thus would be helpful in administration of such regulations and codes.

Light output also may be regulated based on the level of illuminance, measured in footcandles or lux, at the eye of a person viewing the source from a particular location. The term "eye illuminance" is used in the industry to specify the lighting level at a person's eye received from an individual luminaire or group of luminaires, and is measured on a plane perpendicular to the line of sight when the person is looking at the source of light.

Another method of specifying a light level in a regulation is to base the regulation on the level of total horizontal illuminance on the ground at a particular location, taking into consideration light received from all luminaires present, or, alternatively, the total vertical illuminance on a specified plane at a particular height above the ground.

Another method of specifying an allowable light level in a regulation is in terms of the luminance or photometric brightness of a source of light. This light source may be from a lighting fixture itself or the light source can be the light reflected from a surface.

For light trespass and glare regulations to be practical and effective there must be a method of measuring the specified light quantity. This will allow a determination to be made at to whether a particular luminaire or lighting installation meets the applicable code.

Currently there is no machine or equipment that will easily measure light intensity from a distant location. For light trespass measurements there is a pressing need for a convenient portable light meter device that will allow the measurement of the aforementioned various lighting quantities. Intensity is the measurement of lumens per steradian, in candelas. Such measurements require that both the illuminance at the point of interest and the distance from the point of interest to the source of light be known. As of now there is no piece of equipment that can perform light intensity measurements in the field.

The use of the apparatus disclosed herein along with solving various algorithms and appropriate formulas is used to calculate light intensity in the field.

In addition to measuring light intensity a multifunction light meter, such as the light meter being disclosed herein, should to be most useful, also be capable of measuring the other aforementioned lighting quantities, such as, but not limited to, luminance and illuminance, that are related to spillover light, light trespass and various types of glare.

Regulations that limit the level of light emission for the control of light trespass frequently specify the allowable light from a single luminaire. Therefore it is desirable that the metering device and measurement system be able to measure the light from one luminaire only, even though multiple luminaires may be present and ganged together acting as a single significant light source. A luminaire to be measured in the field may be located at a considerable distance from the meter, and the angle the luminaire subtends to the meter will be small. In other situations, the luminaire may be fairly close to the meter, and its subtended angle may be large. It is thus desirable that the meter's angle of acceptance or field of view, that is, the angular range over which the meter accepts light, be variable in order to accommodate light source fixtures of different sizes and at different distances from the light meter.

When using a conventional telephotometer, or a telescopic spot meter, to measure distant sources, that has a narrow field of view, it can be difficult for the operator to find the light source when sighting through the telephotometer. It is therefore desirable for the telephotometer to have a variable field of view. In a first setting of the telephotometer presented in this disclosure the operator will set the telephotometer to a wide viewing angle thus allowing a light source of interest to be easily identified and targeted in a cross hair targeting element of the telephotometer. In a second setting the operator can set the field of view to be more narrow thus viewing only the luminaire of interest in the crosshairs of the telephotometer.

Certain types of light trespass measurements may require simultaneously measuring the light from several luminaires, for example, a group of luminaires on a single pole. The field of view of the light meter should be able to be widened to accomplish this. This is yet a further reason for needing a light meter that is variable in terms of its angular range of acceptance.

One object of this invention is to provide a light meter that can measure light intensity of a distant light source.

It is another object of this invention to provide a device that will calculate light intensity using a single portable device and display the light intensity measurement on the device.

It is a further object to provide a light meter that can measure eye illuminance from a selected source of light.

It is another object of this invention to provide a light meter that will calculate eye illuminance using a single portable device and display the eye illuminance measurement on the device.

It is yet a further object to provide a light meter system that has the capability of measuring the total illuminance received on a horizontal plane, or on a selected vertical plane.

It is a still further object of the light meter system to provide the ability to measure light intensity or eye illuminance from a single lighting fixture only, which may vary from one fixture to another in its angularly subtended size, or from a group of lighting fixtures in proximity to each other.

A still further object is to provide an instrument with an initial wide field of view for identifying the location of a light source of interest, then, after the light source has been acquired, reducing the field of view to be more narrow than the initial wide field so to exclude extraneous light sources.

It is yet another object of the light meter system to optionally provide the ability to selectively measure the luminance of a light source and/or of the light reflected from a surface.

It is also an object of the invention to provide a light meter that can measure light intensity, eye illuminance, total illuminance and luminance in an integrated portable device.

It is also an object of this invention to provide a telephotometer that includes an iris diaphragm in the body of the telephotometer.

It is also an object of the invention to provide a method for determining light intensity of a light source.

The preferred embodiments of the invention presented here are described below in the drawings and detailed specification. Unless specifically noted, it is intended that the words and phrases in the specification and the claims be given the plain, ordinary and accustomed meaning to those of ordinary skill in the applicable arts. If any other special meaning is intended for any word or phrase, the specification will clearly state and define the special meaning. Likewise, if a noun, term or phrase is intended to be further characterized or specified, such will include adjectives, descriptive terms or other modifiers in accordance with the normal precepts of English grammar. Absent use of such adjectives, descriptive terms or modifiers, it is the intent the nouns, terms or phrases be given their plain and ordinary English meaning to those skilled in the applicable arts.

Further, the use of the words "function," "means" or "step" in the Specification is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for," and will also clearly recite a function, without also reciting in such phrases any structure, material or act in support of the function. Thus, even when the claims recite a "means for" or "step for" performing a defined function, if the claims also recite any structure, material or acts in support of that means or step, or that perform the function, then the intention is not to invoke the provisions of 35 U.S.C. 112, Paragraph 6. Moreover, even if the provisions of 35 U.S.C. 112, Paragraph 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments, or that are well known present or later-developed, equivalent structures, material or acts for performing the claimed function.

BRIEF DESCRIPTIONS OF THE DRAWINGS

A more complete understanding of the present invention may be derived by referring to the detailed description when considered in connection with the following illustrative figures. In the figures, like reference numbers refer to like elements or acts throughout the figures.

Figure 7:
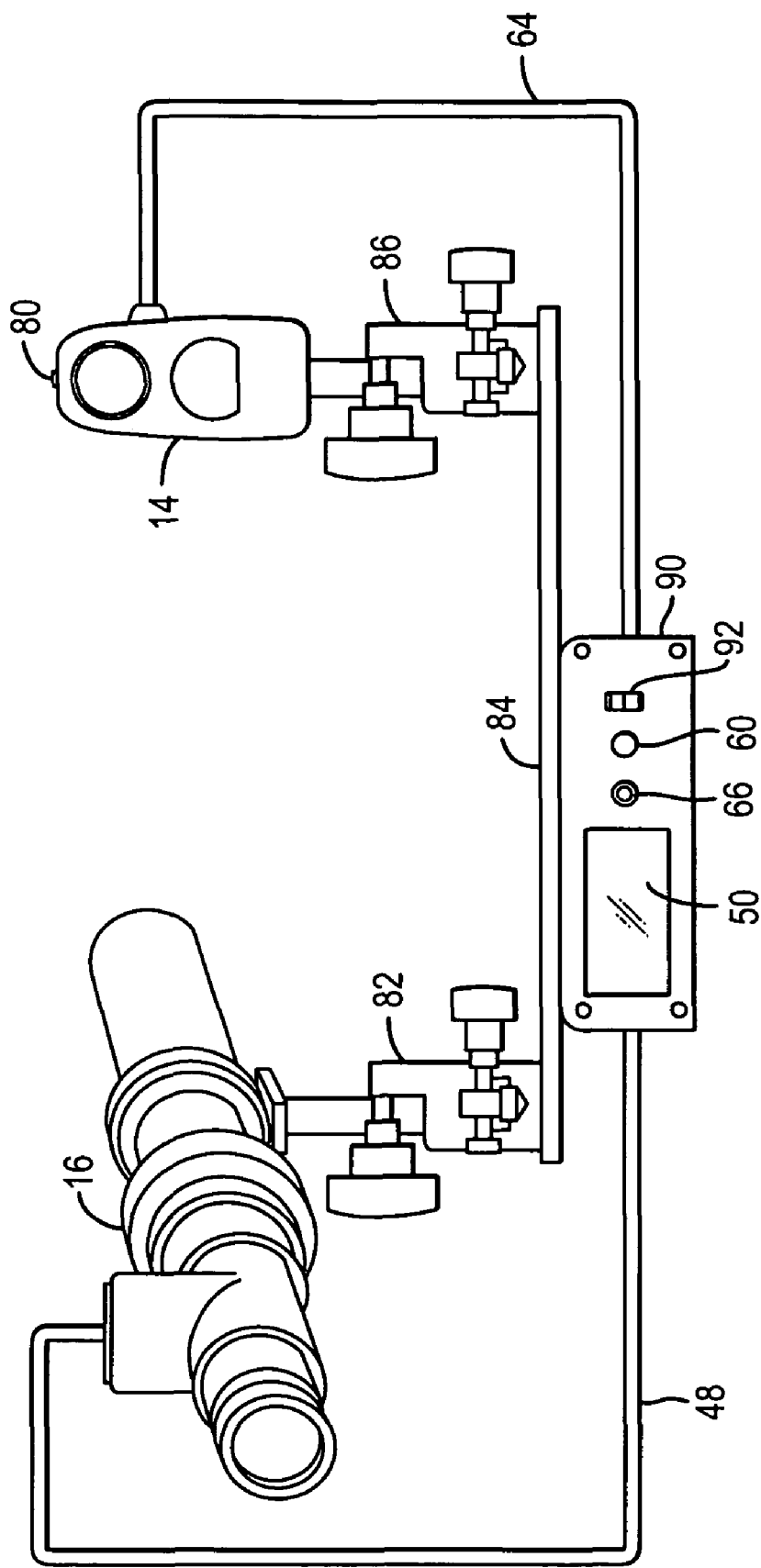
Figure 8A:
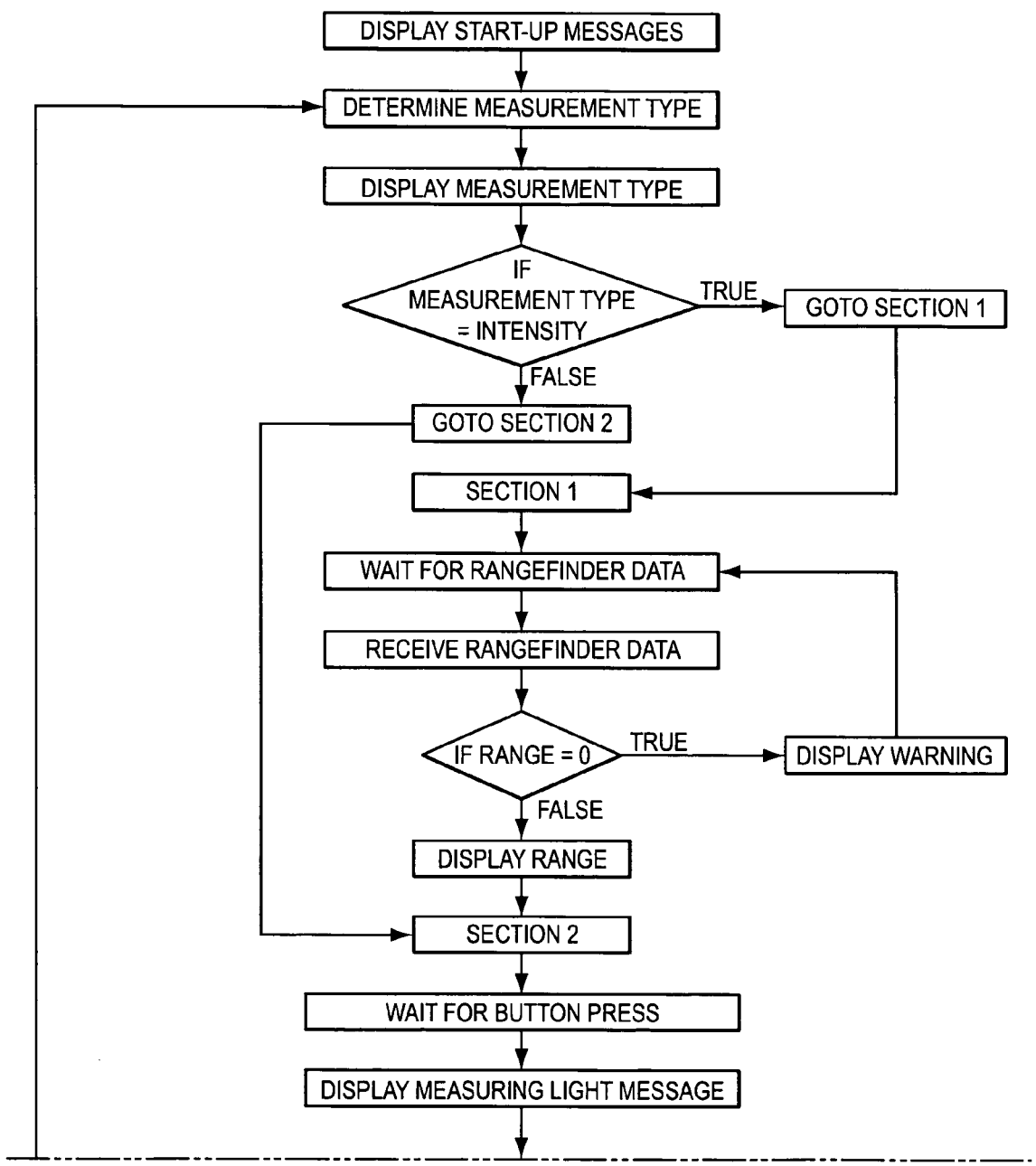
Figure 8B:
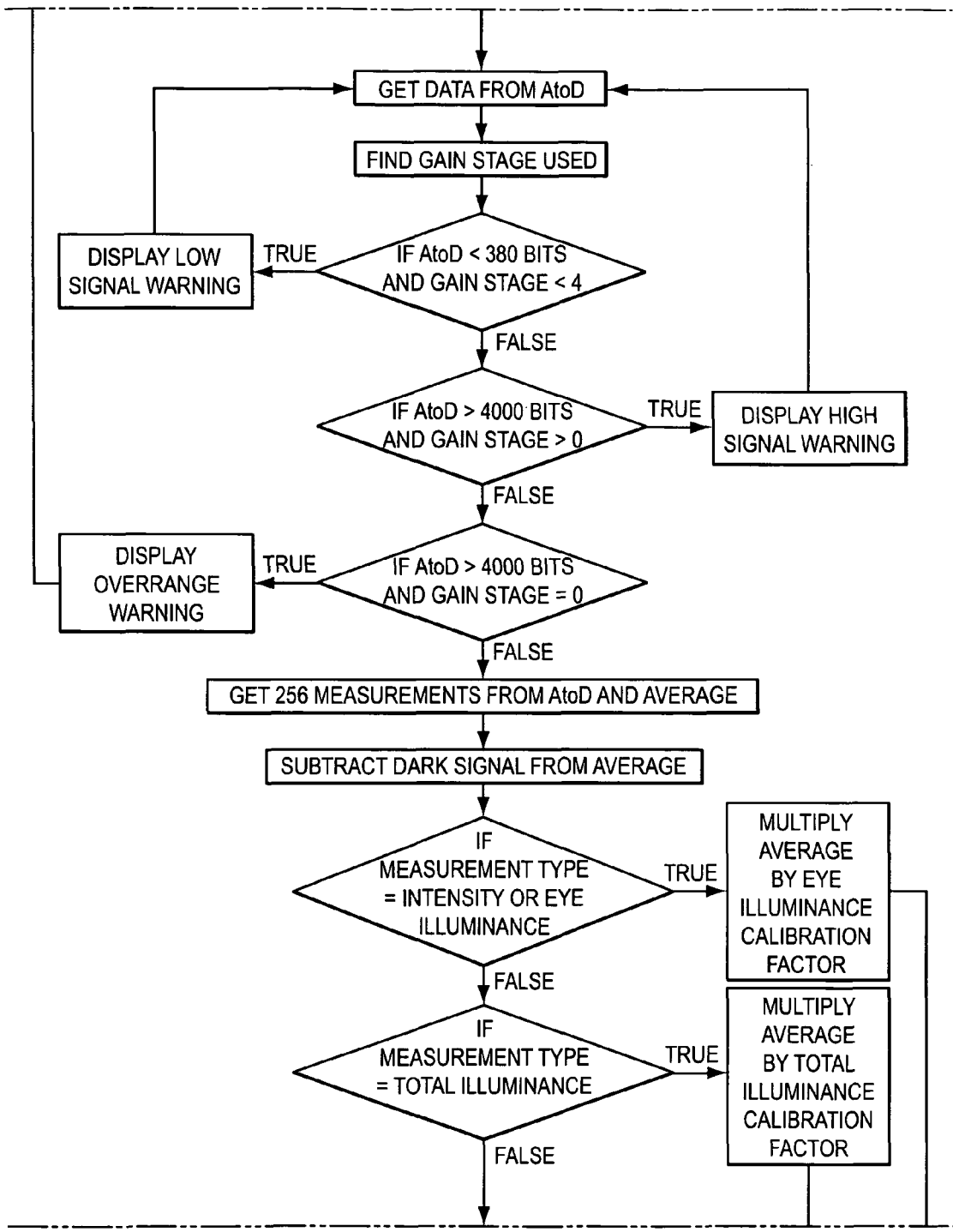
Figure 8C:
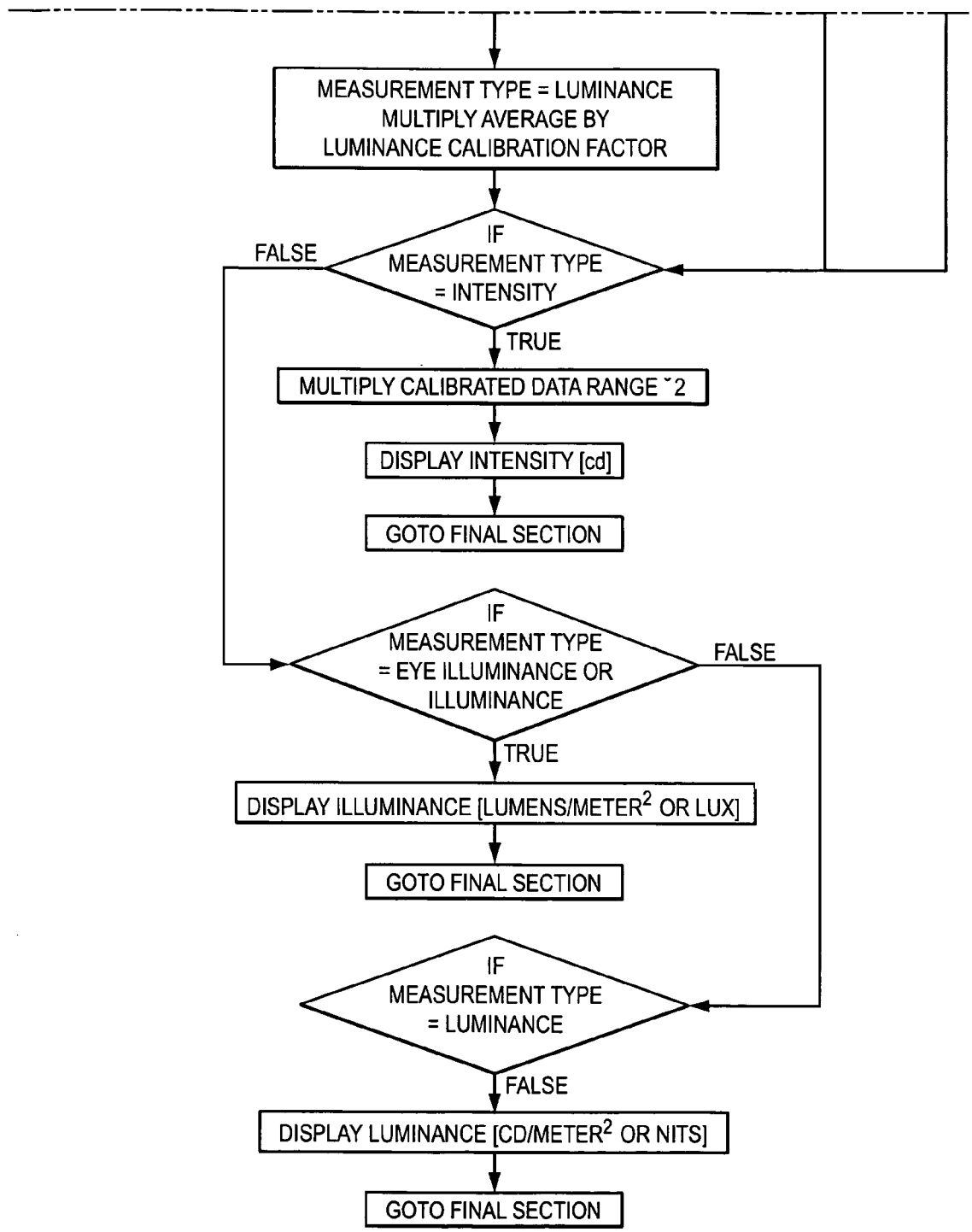
Figure 8D:
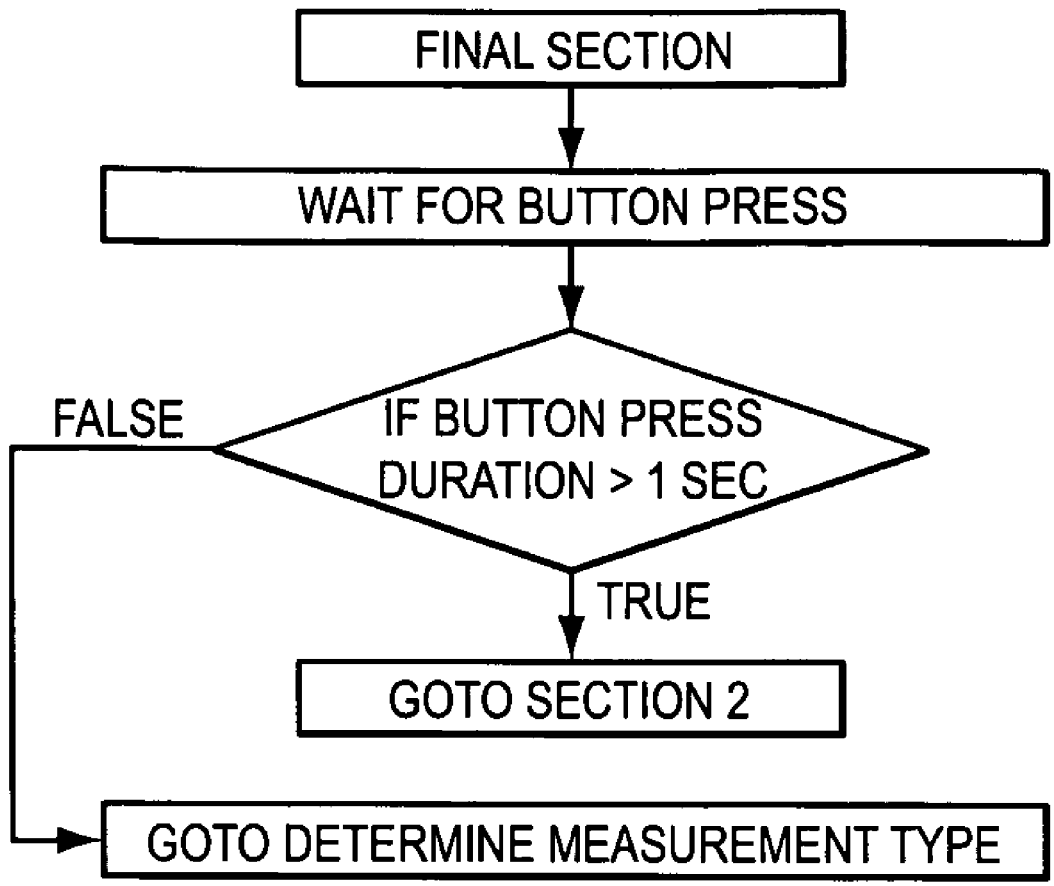

FIG. 7 provides an arrangement for the juxtaposition of the telephotometer, rangefinder and control unit.

FIG. 8 (a-c) is a process flow chart showing the software process used in calculations associated with the light meter.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In one embodiment of the invention the light measuring apparatus comprises a telephotometer having a lens system including an objective lens mounted at one end of a longitudinal body and a photo detector having a data output communication conduit. The photo detector may be mounted to the telephotometer to receive light energy entering the telephotometer. There is also a light metering valve, in one embodiment the valve is an iris diaphragm, located in the body of the telephotometer, generally at the focal plane of the objective lens, between the location of the objective lens and the location of the photo detector. In an alternative embodiment, the light metering valve is a continuously adjustable light metering valve. Another component of the device is a controller, which includes a digital processor in communication with the photo detector through the provided communications conduit. Another element of the device is a range finder having electronic communication capability in communication with the controller. This range finder, which may be a laser range finder, is substantially longitudinally aligned, with the body of the telephotometer. The range finder and the telephotometer may be longitudinally aligned or may be substantially longitudinally aligned within about five degrees of the longitudinal axes of each other. In some situations it may be appropriate to have the range finder and the telephotometer offset in their respective aiming directions so that the range finder can determine the range to, for example, the light source supporting element rather than to the light source itself.

Figure 1:
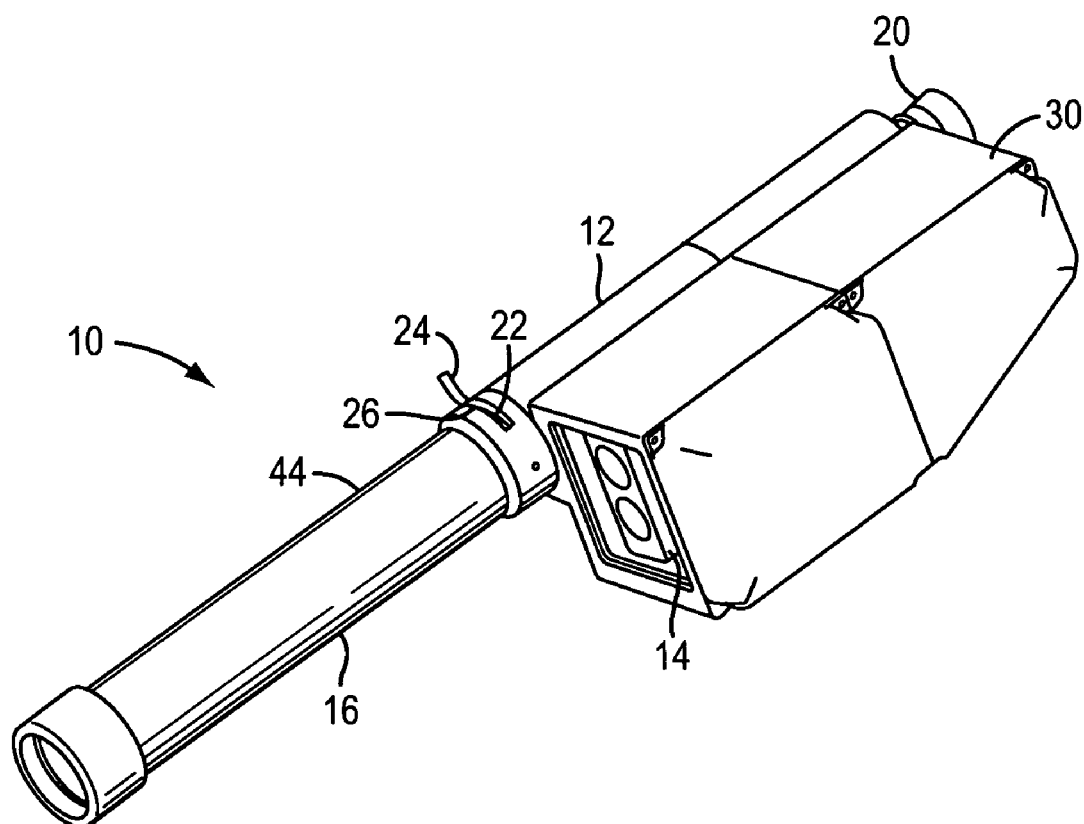
FIG. 1 shows a pictorial representation of a light meter.

FIG. 1 is a representation of a light meter for use in measuring light in several different ways.

The light meter generally 10 includes a housing 12 containing three main parts that work in concert to measure light, process data, output data in a usable format through a display that shows the light meter reading results of the operation of the light meter.

The metering system consists of a specially adapted telephotometer containing a photo detector and a range finder. The output from the telephotometer and the range finder is fed to a control unit or processor, which can include a computer or other programmable device. Through suitable electronic circuitry, programming and calibration of the control unit, a numerical display that is connected to the control unit can indicate at least one of four operator selected options showing measured quantity of luminance, total illuminance, eye illuminance and/or light intensity.

In an alternative embodiment the light meter does not include a range finder. When used without a rangefinder, the light meter can display measured total illuminance, eye illuminance and/or luminance. When used in conjunction with the rangefinder, the meter is able to display measurements of light intensity.

A range finder 14, in one embodiment the range finder is a laser range finder, however other types of range finders, such as but not limited to a radar based range finder or a sonar based range finder, may be used in the light meter. The rangefinder is aimed at the luminaire or luminaires of interest and will measure the distance to those light source targets. A preferred rangefinder is equipped with some form of electronic output, such as a BCD (binary-coded decimal) interface that will show the operator the reading computed by the light meter on the screen 50 shown in FIG. 3.

An example of a laser range finder that could be incorporated into the light meter is a TruPulse Model 200 from Laser Technology. This is a serial or Bluetooth connectable laser range finder that has capability necessary to perform one embodiment of the invention. This range finder model is just one of many laser range finders that are available and would be suitable for incorporation into the light meter disclosed herein.

A telephotometer 16 is carried by and integrated into the housing 12.

Figure 2:
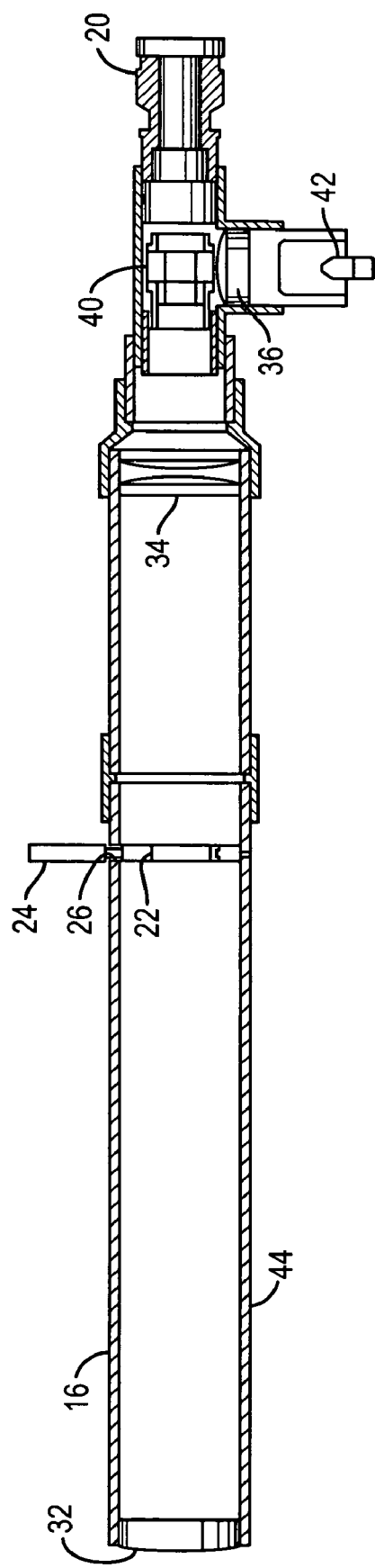
FIG. 2 is a cross sectional view of a telephotometer of the type used in the light meter.

FIG. 2 is a cross sectional view of the telephotometer 16. The telephotometer 16, by itself and not including a range finder, is capable of measuring the luminance and illuminance from a distant light source. The telephotometer contains a lensing system, including in this embodiment, an achromatic lens 32 forming the objective lens, a first set of plano convex lenses 34, and a final plano convex lens 36. The lensing system will cast an image of the luminaire, the luminaire being the light source of interest being measured, onto a conveniently placed focusing eyepiece 20. The eyepiece 20 is carried at the end of the telephotometer to allow an operator to sight in and align the telephotometer on a target. The eyepiece 20 allows the operator to view the light source being measured, and thereby assists in proper aiming of the telephotometer. A beam splitter 40, including a beam splitter holder and beam splitter prism located in the path of the collected light rays directs a portion of the light collected by the telephotometer to a photo detector 42. The size of the photo detector 42 is equivalent to the size of the area seen in the eyepiece 20 so that the operator can see what area of the target light source is being measured.

The telephotometer 16 of this invention includes an adjustable iris diaphragm 22 not available in state of the art telephotometers. It is located and mounted in the tube of the telephotometer at the focal surface or proximate the focal plane of the telephotometer as determined by the focal length of the object lens. Ideally, but not absolutely necessary, the iris diaphragm would be mounted on the focal plane.

Certain types of light trespass measurements may require simultaneously measuring the light from several luminaires, for example, a group of luminaires on a single pole on an athletic field or in a parking lot, to name a few. The field of view of the light meter should be able to be widened to accomplish acquiring the group of luminaires. The iris diaphragm 22 provides this capability in that it can be opened to a wide field of view. The iris diaphragm 22 can subsequently be closed down to narrow the field of view as necessary.

This iris diaphragm, or iris control, is an adjustable aperture to limit the angular range of acceptance of the light rays, or field of view of the telephotometer. The iris diaphragm 22 has an operating lever 24, in the front tube 44 of the telephotometer. The iris diaphragm 22 is controlled by the lever 24 positioned to move through a circumferential slot 26 in the body of the telephotometer. The iris diaphragm 22 is continuously variable between its fully open and fully closed settings to meter the amount of light passing through the telephotometer such that discrimination is possible to limit or expand the field of light to be measured. By viewing through the eyepiece 20 and adjusting the iris diaphragm 22 aperture, the operator can aim the device, using the crosshair targeting element, at the light source(s) of interest, see the area of light acceptance, and adjust the field of view to capture light from an individual luminaire or a selected group of luminaires, as desired. An alternative to the iris diaphragm is an aperture valve or iris valve of the type that can open or close a film of material in the shape of a very short sleeve to allow more or less light to pass through the telephotometer. Another alternative to the iris diaphragm is the use of multiple fixed apertures, which are either separately inserted or placed on an aperture wheel mounted in the front tube of the telephotometer. This alternative may not offer the same convenience to the user of the light meter and requires more expensive components. As shown in FIG. 2, there is a telephotometer that includes the iris diaphragm. This modification, the inclusion of an iris diaphragm in the telephotometer, is contemplated as a stand-alone device that can be fitted to telephotometers that are sold without the range finder configuration set forth herein.

Figure 5:
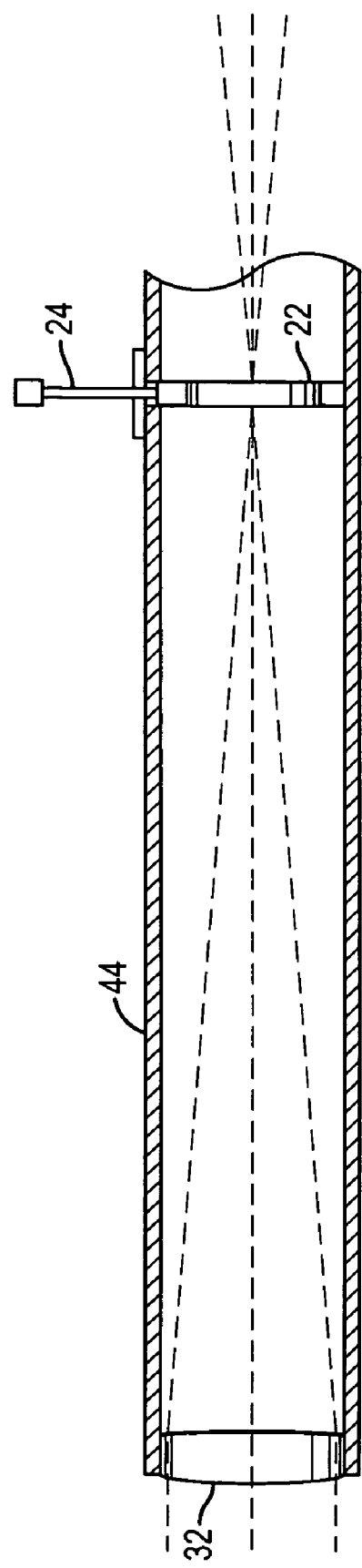
FIG. 5 is a pictorial view showing one location of the variable iris according to the preferred embodiment.

FIG. 5 is a representation of a portion of the telephotometer showing one location of the adjustable iris diaphragm 22. In this embodiment the iris diaphragm is located at the focal plane of the system as determined by the object lens 32.

Figure 6:
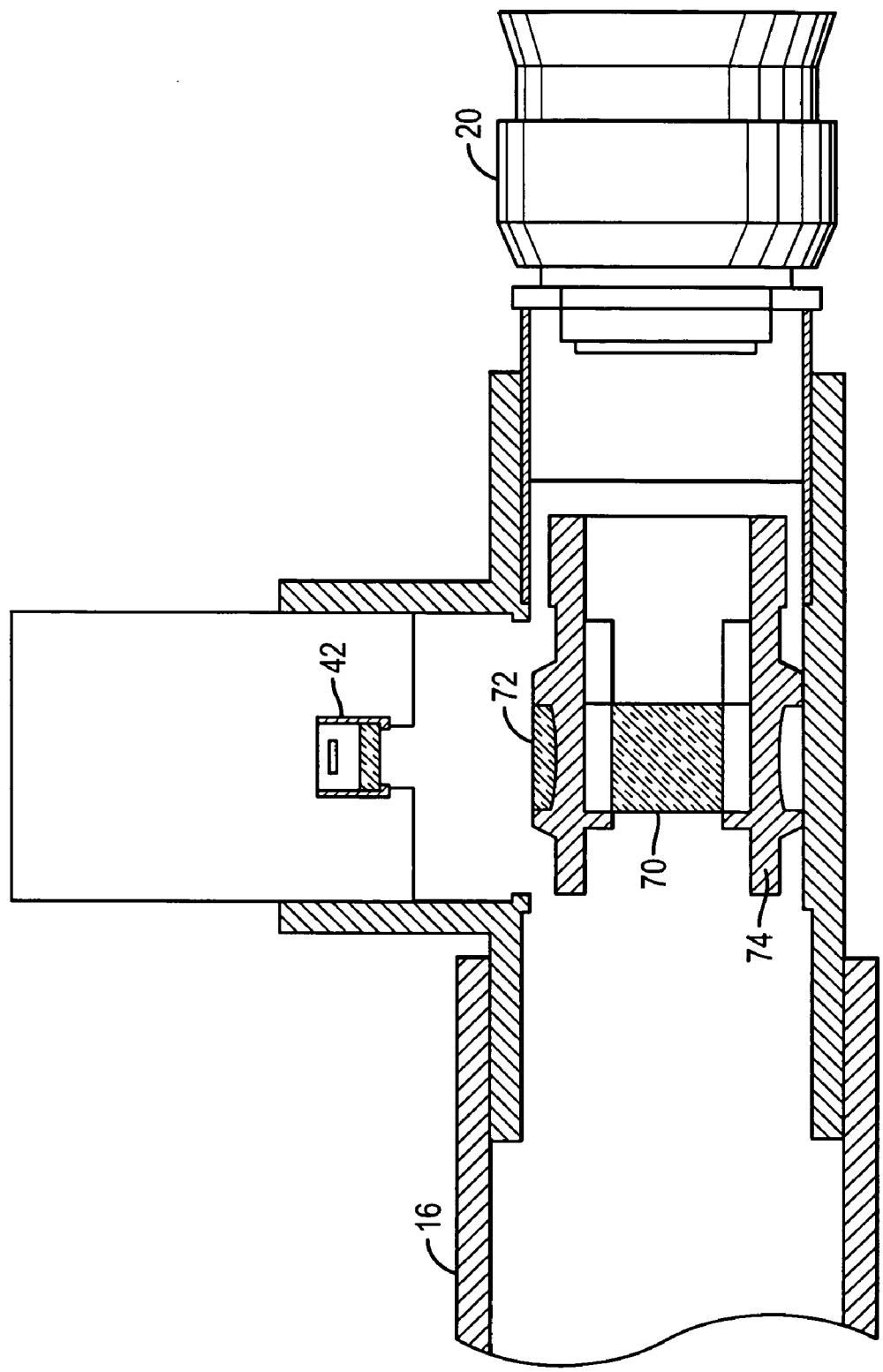
FIG. 6 is a detailed view of an arrangement for the beam splitter, photo detector and eyepiece.

FIG. 6 is a more detailed pictorial representation of a partially sectioned view of the photo detector 42 holder section of the telephotometer 16. In this figure the photo detector 42 is carried in the body of the telephotometer such that a beam splitter 70 receives a portion of the light beam collected by the objective lens 32 of the telephotometer after the light passes through the beam splitter 70 and a focusing lens 72 carried in a beam splitter holder 74.

The light meter shown in FIG. 1 also includes a housing portion 30. This section of the light meter will house a control unit including the processor of the device. The processor is a microprocessor based device that will be fed analog or digital information collected by the telephotometer 16, receive and process information sent to the processor from the range finder 14, and compute light intensity, in one mode of operation, for display on a screen to the light meter operator.

Figure 4:
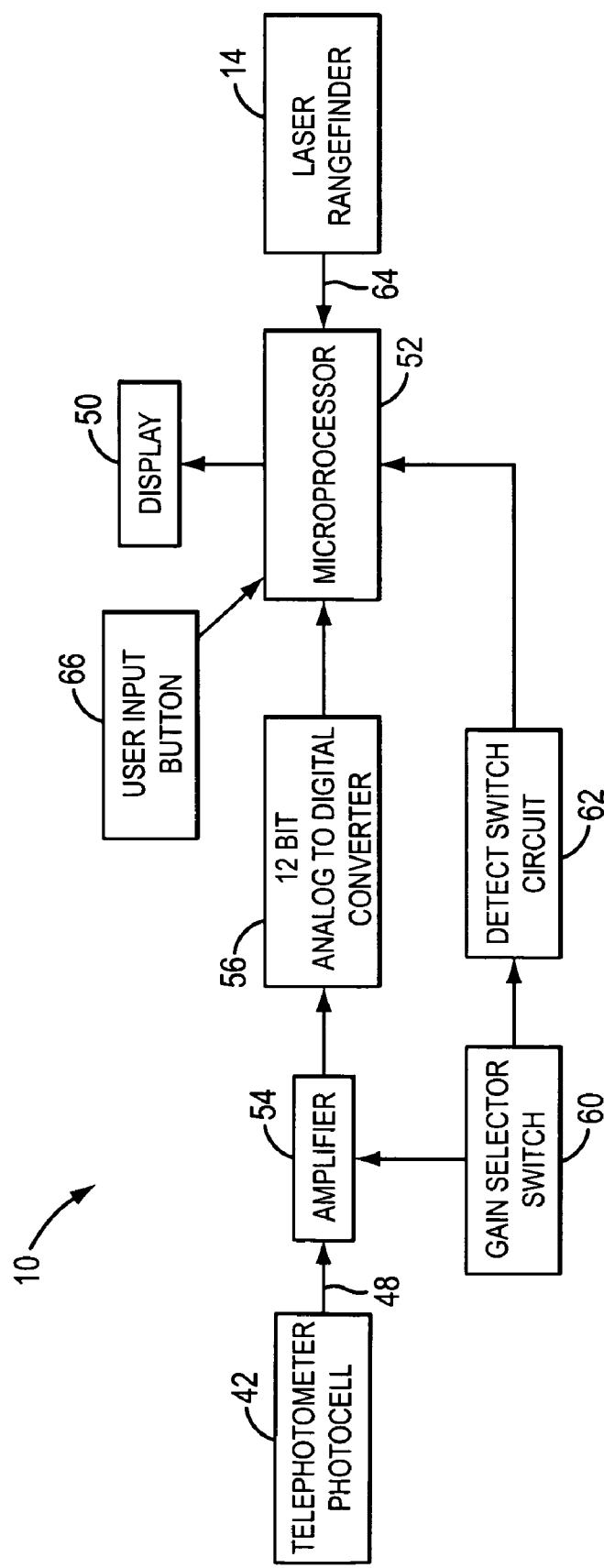
FIG. 4 is a block diagram of the system of the light meter.

A block diagram of the system is shown in FIG. 4. In this figure the processor, such as microprocessor 52, of the control unit has as one of its inputs the signal from the telephotometer photo detector 42. This signal from the photo detector 42, communicated through cable or conduit 48, may be processed through an amplifier 54, in one embodiment an op-amp, controlled by a gain selector switch 60 to operate in a range determined by the operator. In one embodiment of the light meter the amplifier circuit is provided to change light measurement ranges to accommodate light sources of greatly varying output and at varying distances. This can be achieved, for example, by selecting different feedback resistors for the amplifier circuit in the control unit to which the photo detector is connected so as to alter amplifier gain.

The amplified signal is processed in the A/D converter 56 to convert the amplified analog signal from the photo detector to a digital signal. Detect switch circuit 62 is in the circuit between the gain selector switch and the microprocessor 52. This detect switch circuit 62 is connected to the gain selector switch 60 to communicate to the microprocessor the level of amplification selected by the operator. The amplified signal, which is proportional to illuminance sensed at the telephotometer photo detector 42, from the A/D converter 56 is then processed by the microprocessor 52.

Figure 3:
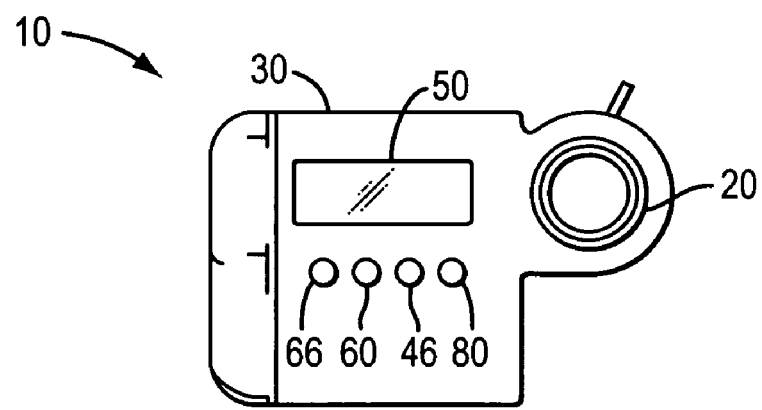
FIG. 3 is a view of the back of the light meter shown in FIG. 1.

In situations where distance to a target light source is needed to measure light intensity in the field, that being the utility of one of the embodiments described herein, the range finder 14 capability will be implemented. As shown in FIG. 3 a momentary switch 80 is provided. This momentary contact button or switch is the "fire" button of the range finder. When pressed by the operator of the light meter the distance measurement to the distant object, such as a distant light source fixture, is acquired by the range finder. The distance measurement sensed by the range finder, in one embodiment a laser range finder, is first processed onboard the range finder using the range finder internal processor and then the output signal representing the distance to the distant object, such as a light source fixture, is sent by hardwire or other data transmission options, such as but not limited to radio transmission, through communication conduit 64 (FIG. 4) (one of the laser range finders suitable for use in the invention is RS 232 or Blue-Tooth capable) to the microprocessor 52. This signal represents distance to the target light source and/or the fixture supporting the light source.

Suitable software or firmware programmed into the microprocessor 52 integrates the two readings, that is the illuminance reading from the telephotometer which was stored in the processor and the distance reading from the range finder also stored in the processor and processes this data using the inverse square law algorithm applicable to light intensity measurement to provide the intensity of the light source of interest in candelas. The inverse square law as applied in the context of measuring light intensity is: Intensity equals lux times the distance squared. Intensity is expressed in candelas. Illuminance is expressed in lux and distance is expressed in meters in most situations.

The system includes the capability to place the acquired distance measurement in memory of the microprocessor such that, if so desired, the distance value can be applied, or used in a calculation for subsequent light readings for the computation of intensity of additional light sources that are at the same or similar distance without having to remeasure the distance to each one of these subsequently selected light sources.

FIG. 8 (*a-c*) is a process flow chart showing the software process used in the light meter processor. This chart starts with power on of the unit to display startup messages. In the mode of measuring light intensity (switch 46 set to "light intensity"), assuming the light meter is set to measure light intensity, no other switch will need to be set at this point. Continuing on in the chart, steps pertaining to the range finder operation through "Display Range" which may also include transmitting or sending the range data to the processor where it will be stored, are set forth on the chart.

The next stage represented on the chart is where the process steps of measuring light illuminance at the measuring location coming from the light source is processed. Initiation of this measurement is triggered by pressing switch 66. Part of this cycle is determining the correct range for properly collecting data and notifying the operator of a high or low light condition so that the gain can be adjusted by the operator. Once the gain is in an appropriate range, which can be set by using the gain selector switch 60 in FIGS. 3 and 4, the measurement of the illuminance is made. The measurement will be further processed to average a number of readings, subtract the dark signal from the average and adjust the average by a calibration factor. This value will be stored in the processor. The processor will perform the inverse square algorithm on the light source illuminance data and the stored distance data sensed by the range finder to arrive at the value in candelas of the light intensity of the light source being measured.

The embodiment described above is generally directed toward a light meter that is used to measure light intensity of a light source from a distance. This capability is derived largely from the inclusion of the range finder in the light meter. The light meter can also be used without use of the rangefinder. Switch, such as switch 46 in FIG. 3, or some other form of selector switch, is employed to switch between the total illuminance, eye illuminance, intensity, and luminance modes of measurement.

In another embodiment where the selector switch is set to eye illuminance, illuminance or luminance, these photometric quantities can be measured using the steps set forth in the chart of FIG. 8.

Switch 60, referred to herein as a gain selector switch, in this figure is provided to change light measurement ranges to accommodate light sources of greatly varying output and at varying distances. This can be achieved, for example, by selecting different feedback resistors for the amplifier circuit in the control unit to which the photo detector is connected so as to alter amplifier gain, as is well known in the art.

For instance, when the light meter is to be used as a luminance measuring device, the switch 46 is set to the luminance measuring setting and the device is aimed at a source of light such as a luminaire in close proximity, such that the field of view is entirely filled by the lighted luminaire. With proper calibration, the light meter then provides a reading of the average luminance of the area being measured, in units such as candelas per square meter. For the luminance calibration to be valid, the aperture that controls the angular size of the field of view must be identical during calibration and measurement. The iris diaphragm diameter control, which is used in one embodiment as set forth above, may not exist on every embodiment of the disclosed light meter. If an iris diaphragm is present on the light meter being used, the body of the light meter can be marked with a setting to be used for luminance measurements, or can be fixed at a certain diameter by conventional means such as a click-stop.

The arrangement for measuring the average luminance of a selected area of a luminaire may also be used to measure the luminance of a reflecting surface. All that is needed is for the metering system to be equipped with sufficient sensitivity to make possible the measurement of luminance of low levels, as are typical of many reflecting surfaces.

In one embodiment of the invention the photo detector carried in the photo detector holder 42 may be removed from the telephotometer 16, and used to measure the total illuminance on a surface. In this situation the switch 46 will be set to the total illuminance measuring setting. By positioning the photo detector in a horizontal plane, and with suitable calibration, the light meter displays total horizontal illuminance on the horizontal surface on the screen 50 of the light meter. Similarly, by holding the photo detector in a vertical plane, or in a horizontal plane, or in some situations in an arbitrary plane, total illuminance is measured. For total illuminance measurements, a cosine correction device may be added to the front of the light sensitive area. When measuring total horizontal or total vertical illuminance, the use of the rangefinder is not necessary.

FIG. 7 is a representation of a light meter wherein the components are not housed in a unified housing. In this embodiment the telephotometer is mounted on an adjustable camera mount 82 which is mounted to a support 84. Also carried on the support 84 is the laser range finder 14 likewise mounted on a camera mount, that being second camera mount 86. The controller 90, containing the microprocessor of the light meter, is also mounted to the support 84. The face of the controller will have a screen 50 and several control inputs. In the embodiment shown there are three switches or controls. These include a user input button 66, a gain selector switch 60 and an on/off switch 92. A fire button for taking a measurement in the range finder is shown as button 80.

In another embodiment of the controller faceplate, or in the unit shown in FIGS. 1 and 3 there may be four inputs including the selector switch 46, which is used to switch between the total illuminance, eye illuminance, intensity, and luminance modes of measurement; the user input button 66 which is used to record the light source intensity data (or other light source data, such as, but not limited to, eye illuminance, total illuminance and luminance of the light source) when the button 66 is actuated; a gain selector switch 60 and momentary switch 80, which is the "fire" button of the range finder.

Returning to FIG. 7, other switches or input or output elements, such as, but hot limited to, a computer connection port such as a USB port, a screen or a radio communication port, to name just two of several ports or switches that may also be incorporated on the front panel of the controller or, for that matter, at any point on the controller housing. In one embodiment the controller housing will include a camera mount receiver so that the entire unit can be supported on a conventional camera tripod.

In summary, the method of determining the light intensity at a point distant from a light source in a fixture includes the acts of providing an enhanced telephotometer. The telephotometer will have a lens system including an object lens mounted at one end of a longitudinal body. The telephotometer will also include a photo detector having a data output communication conduit, the photo detector being mounted to the telephotometer to receive light energy entering the telephotometer. The telephotometer further has a light metering valve, such as but not limited to an iris diaphragm, located in the body of the telephotometer between the location of the object lens and the location of the photo detector. This location is generally at the focal plane of the object lens. A controller is also provided in the light meter. The controller includes a digital processor and a display screen and is in communication with the photo detector through the communications conduit. A third element of the light meter is a range finder having electronic communication capability in communication with the controller. The range finder, in one embodiment, is longitudinally aligned with the body of the telephotometer. The second act in the method of determining light intensity is having the operator of the enhanced telephotometer direct the telephotometer at the targeted light source supported in a light source fixture. Once on target the enhanced telephotometer will compute the distance to the fixture supporting the light source as sensed by the range finder. Next the level of light from the light source as received at the photo detector will be processed by the processor. This data point will be stored in the processor. The computed distance to the light source fixture, computed using data from the range finder with the distance value stored in the processor, and the level of light received at the photo detector and now stored in the processor will be processed to generate a value of light intensity. The computed value of light intensity at the point where the measurement is taken and distant from the light source, will then be displayed through a display screen associated with the enhanced telephotometer.

While the invention is described herein in terms of preferred embodiments and generally associated methods, the inventor contemplates that alterations and permutations of the preferred embodiments and methods will become apparent to those skilled in the art upon a reading of the specification and a study of the drawings.

Accordingly, neither the above description of preferred exemplary embodiments nor the abstract defines or constrains the invention. Rather, the claims variously define the invention. Each variation of the invention is limited only by the recited limitations of its respective claim, and equivalents thereof, without limitation by other terms not present in the claim.

What is claimed is:

1. Light intensity measuring apparatus for measuring light from a distant light source comprising:
    a telephotometer having a lens system including an objective lens mounted at one end of a longitudinal body and a light energy detector having an information output communication conduit, the light energy detector mounted to receive light energy from a distant light source, the light energy entering the telephotometer through the objective lens;
    a light metering valve for controlling the field of view at the distant light source and limiting the angular range of acceptance of light rays at the light metering valve, the valve located in the body of the telephotometer at the focal surface location of the objective lens;
    a controller, the controller including a digital processor, in communication with the light energy detector through the communications conduit;
    a range finder for determining the distance to the light source, the range finder having electronic communication capability in communication with the controller, the range finder aligned substantially longitudinally with the body of the telephotometer.

2. The invention in accordance with claim 1 wherein the metering valve is an adjustable iris diaphragm at the approximate focal plane of the objective lens.

3. The invention in accordance with claim 1 wherein the metering valve is an adjustable iris diaphragm located at the focal plane of the objective lens.

4. The invention in accordance with claim 1 wherein the light energy detector comprises a photo detector.

5. The invention in accordance with claim 1 wherein the light energy detector comprises a photodiode.

6. The invention in accordance with claim 1 wherein the light measuring apparatus comprises a housing supporting the telephotometer, the controller and the range finder.

7. The invention in accordance with claim 1 wherein the controller digital processor receives data from the light energy detector and from the range finder and outputs data to a display in communication with the digital processor.

8. The invention in accordance with claim 7 wherein the data output from the digital processor is the calculated light intensity of a distant source of light.

9. The invention in accordance with claim 7 wherein the display comprises a screen and light intensity measured by the light intensity measuring device is displayed on the screen.

10. The invention in accordance with claim 4 wherein the controller comprises a switch for selectively activating the range finder of the light measuring apparatus.

11. The invention in accordance with claim 1 wherein the light meter comprises:
    a selector switch connected to the controller;
    circuitry connecting the controller the selector switch, the selector switch for switching the light meter from a setting for measuring light intensity to a setting for measuring total illuminance, or to a setting for measuring eye illuminance or to a setting for measuring luminance.

12. The invention in accordance with claim 1 wherein the light energy detector is removable from the telephotometer to be remotely located in a plane to measure total illuminance.

13. Light intensity measuring apparatus comprising:
    a telephotometer having a lens system including an objective lens mounted at one end of a longitudinal body and a photo detector having a data output communication conduit, the photo detector mounted to the telephotometer to receive light rays entering the telephotometer through the objective lens;
    an iris diaphragm located in the body of the telephotometer proximate the focal plane location dictated by the position of the objective lens on the longitudinal body;
    a controller, the controller including a digital processor, in communication with the light photo detector through the communications conduit;
    a range finder in communication with the controller.

14. The invention in accordance with claim 13 wherein the light energy detector is removable from the telephotometer to be remotely located in a plane to measure total illuminance.

15. A method of determining the light intensity of a light source supported in a distant fixture, the method comprising the acts of:
    providing a telephotometer, the telephotometer having a lens system including a first lens mounted at one end of a longitudinal body and a photo detector having a data output communication conduit, the photo detector mounted to the telephotometer to receive light energy entering the telephotometer, the telephotometer further having a light metering valve located in the body of the telephotometer between the location of the first lens and the location of the photo detector and a controller, the controller including a digital processor and a display screen, the controller in communication with the photo detector through the communications conduit, and a range finder having electronic communication capability in communication with the controller, the range finder substantially longitudinally aligned with the body of the telephotometer;
    directing a telephotometer at the light source;

adjusting the light metering valve to selectively limit the field of view to capture light from a luminaire;

computing the distance to the fixture supporting the light source as sensed by the range finder and storing the distance in the digital processor;

recording the illuminance of light from the light source as received at the photo detector in the digital processor;

processing the computed distance to the light source fixture and the illuminance of light received at the photo detector in the digital processor to generate a light intensity value;

displaying the light intensity value on the display screen.

* * * * *